Dec. 19, 1950  A. B. PERRY ET AL  2,534,530
CONTROLLED PACKING CONSTRUCTION
FOR PUMPS OR THE LIKE
Filed July 22, 1947  2 Sheets-Sheet 1
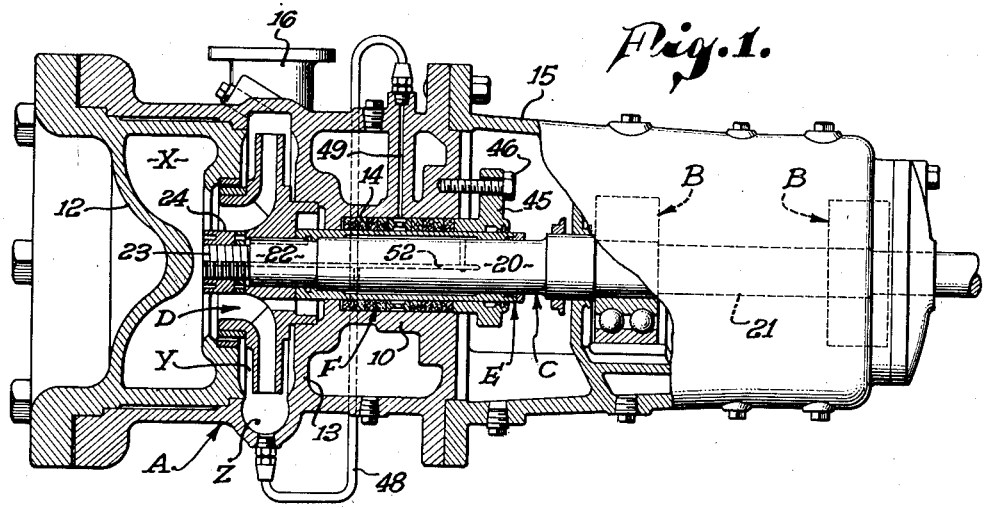
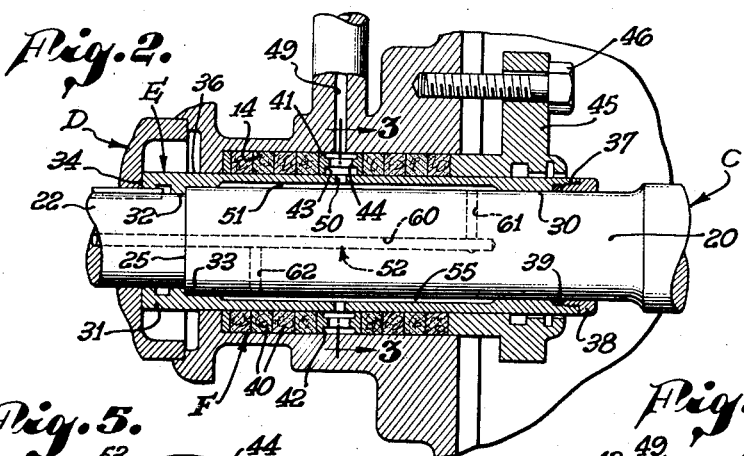
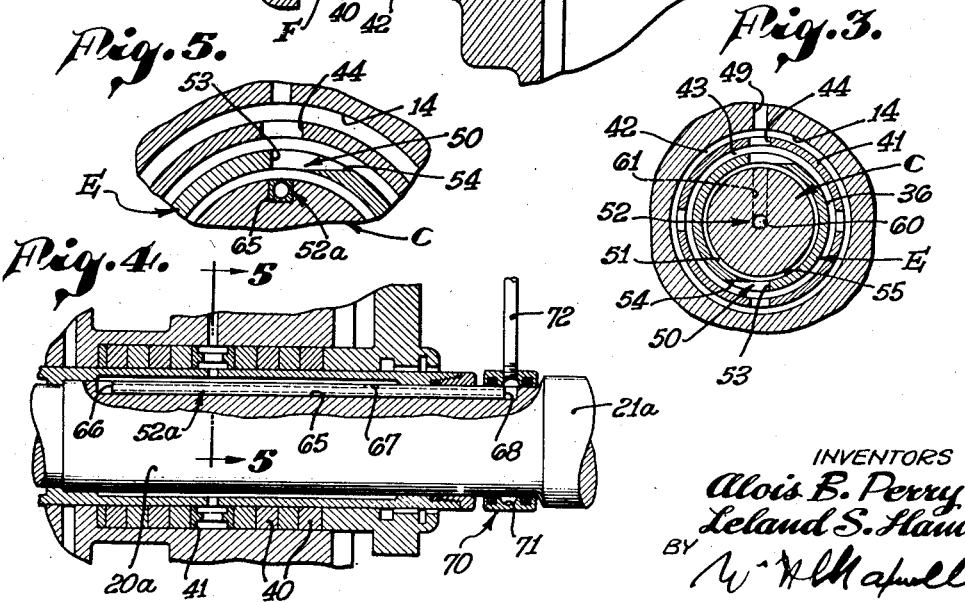
INVENTORS
Alois B. Perry
Leland S. Hamer
BY
W H Maxwell
ATTORNEY

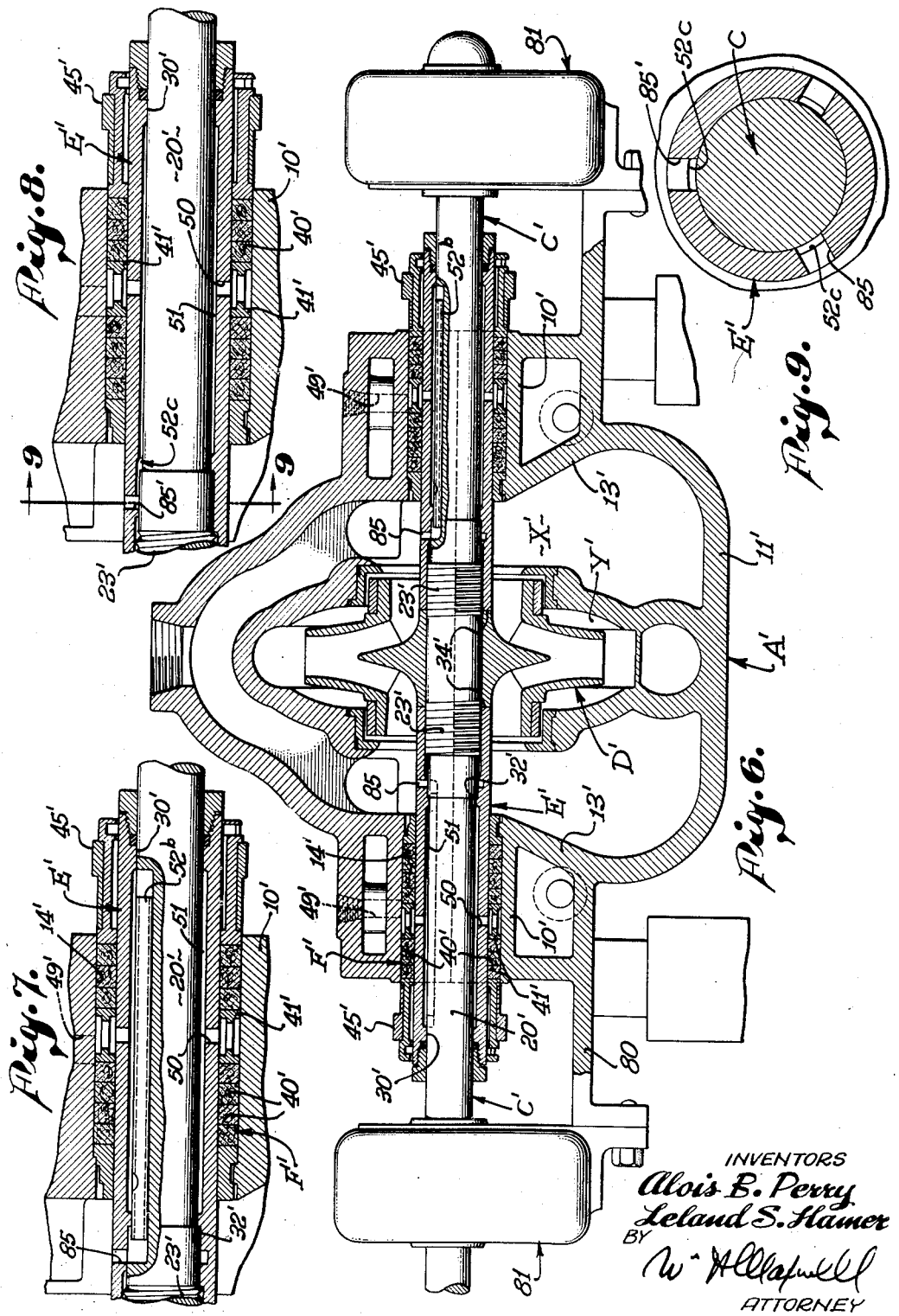

Patented Dec. 19, 1950

2,534,530

UNITED STATES PATENT OFFICE 2,534,530

CONTROLLED PACKING CONSTRUCTION FOR PUMPS OR THE LIKE

Alois B. Perry, Los Angeles, and Leland S. Hamer, Long Beach, Calif.

Application July 22, 1947, Serial No. 762,584

5 Claims. (Cl. 286—8)

This invention has to do with a controlled packing construction for a pump or the like, the construction of the present invention being particularly applicable to rotary or centrifugal pumps and to the gland or packing elements commonly employed on or around the shafts or such pumps. The invention in its broader aspects may be incorporated in or applied to various machines wherein a shaft or the like operates, that is, either turns or reciprocates in a packing assembly. We refer to a rotary pump since the invention can be used to great advantage in such a machine.

Centrifugal pumps, whether of vertical or horizontal type, are characterized, generally, by a housing formed to provide suitable ports or chambers, a shaft supported in the housing by suitable bearings, an impeller operating in the housing, and one or more stuffing boxes or packing constructions around the shaft to prevent leakage along the shaft. In some such pumps the shaft is carried in spaced bearings at one side or end of the housing and but one gland or packing is required, while in other pumps the shaft extends through the housing from one side or end to the other, in which case two glands or packings are required.

It is highly important, when handling some fluids, as for instance highly volatile fluids, that leakage be minimized or positively prevented, if possible, and in an attempt to provide a leakproof packing construction for a pump shaft a sleeve construction has heretofore been used or applied to the shaft at the packing or gland. The ordinary sleeve construction such as we refer to involves a sleeve or jacket mounted securely or tightly on the shaft to occur at the gland or packing and it involves, generally, a sleeve of high grade material that is very accurately finished. Further, and generally when a sleeve construction such as we refer to is employed the gland or packing is cooled by including a lantern ring in the packing and supplying a cooling medium thereto.

It is a general object of the present invention to provide an improved construction for pumps or the like of the general character referred to whereby a packing or gland construction applied to a shaft sleeve, or the like, may be maintained at a constant temperature or within a narrow range of temperature, to the end that the packing or gland construction operates uniformly and in a most efficient and effective manner.

Another object of our invention is to provide a construction for a pump, or the like, of the character referred to, whereby a cooling thermal medium, either a heating or a cooling medium, may be not only supplied to the general locality of the working parts at the packing construction, but is effectively circulated in the immediate vicinity of the working parts. By circulating the thermal medium, say for instance a cooling liquid, heat generated by the working parts is immediately conducted away and as a result the packing or sealing structures is not subject to expansion and contraction likely to vary operating conditions.

A further object of the present invention is to provide an improved shaft and shaft sleeve construction for a rotary pump or the like whereby a coolant or the like supplied to the lantern ring of a packing assembly is conducted therefrom, or is circulated to effectively absorb and dissipate heat generated at the sleeve.

The various objects and features of our invention will be fully understood from the following detailed description of typical preferred forms and applications of the invention, throughout which description reference is made to the accompanying drawings, in which:

In Figs. 1 to 5 inclusive we show our invention applied to a typical horizontal centrifugal pump of the type wherein there are two outboard bearings at one end of the body or case supporting the shaft so that it enters the case through a single packing construction. Fig. 1 is a side elevation of such a pump construction with a portion of the structure shown in section to illustrate the general arrangement of parts. Fig. 2 is an enlarged view of a portion of the structure shown in Fig. 1 showing the shaft sleeve and the parts related thereto. Fig. 3 is an enlarged detailed sectional view of the structure shown in Fig. 2 being a view taken as indicated by line 3—3 on Fig. 2. Fig. 4 is a view similar to Fig. 2 showing another for or application of the present invention wherein the coolant supplied to the shaft instead of being discharged into the pump, as shown in Fig. 1, is picked up by a collector ring to be conducted therefrom. Fig. 5 is an enlarged detailed sectional view of a portion of the structure shown in Fig. 4 being taken as indicated by line 5—5 on Fig. 4. In Figs. 6 to 9, inclusive, we show our invention applied to packings of a horizontal pump of the type wherein the shaft is supported at each end of the case or body, making two packings necessary. In Fig. 6 we show a pump of the general type just referred to with the principal working parts in section to illustrate their general arrangement and relationship. Fig. 7 is an enlarged view of a portion of the structure shown in Fig. 6 showing a shaft sleeve and the parts related thereto. Fig. 8 is a view similar to Fig. 7 showing another application of our invention, that is, showing an arrangement wherein the coolant is handled in a somewhat different manner than that shown in Figs. 6 and 7, and Fig. 9 is a sectional view taken as indicated by line 9—9 on Fig. 8.

Our present invention is primarily concerned with the provision of a construction whereby a thermal medium, say for instance, a coolant such as is ordinarily supplied to the lantern ring of a packing construction, is handled by the sleeve provided on the shaft and around which the packing is assembled, so that it circulates between the shaft and the interior of the sleeve in the region of the packing to receive heat generated by the operation of the packing on the sleeve. With our construction we conduct the thermal medium from the sleeve or from between the shaft and sleeve as by one or more ducts extending lengthwise of the shaft, so that the coolant is conducted away from the sleeve to a point or points where it can be suitably disposed of.

Where the thermal medium employed is the same as the material being handled by the pump, or is of a character that can be mingled with the material handled by the pump, it is convenient to discharge the thermal medium from the sleeve into the stream of material being handled by the pump. When the thermal medium is discharged into the material handled by the pump the material itself may be used as the thermal medium, in which case the medium may be obtained from a high pressure portion of the pump such as the delivery portion. However, if comingling is not convenient or desirable we may cool the thermal medium and handle it in any suitable manner without allowing it to enter the pump. The thermal medium may be applied under any suitable head of pressure or by a pump or the like.

In accordance with the broader principles of our invention we contemplate circulating a material or medium, say, for instance, a liquid, to a shaft sleeve such as we have referred to either to cool it or to warm it. For purpose of example we will refer to the medium or material handled as being a liquid and as being a coolant, it being understood that by such terminology we mean to include any medium or material that will effect either heating or cooling, as circumstances may require.

A typical horizontally disposed simple centrifugal pump such as is shown in Fig. 1 of the drawings, involves. generally, a body A, bearings B supported in the body, a shaft C carried by the bearings, an impeller D on the shaft within the body, a shaft sleeve E on the shaft C where it passes through the collar 10 of the body and packing means F carried by the collar 10 and engaging the shaft sleeve to prevent leakage from the chamber of the body in which the impeller operates.

The particular body A shown in the drawings involves generally, a shell closed by an outer end wall 12 detachable from the shell and by an inner end wall 13 formed integral with the shell. The collar portion 10 of the body A through which the shaft C is admitted into the chamber formed in the shell between the walls 12 and 13 is shown formed integral with and projecting from the inner wall 13 and is counterbored at 14 from its outer end to receive the packing means F. An extension 15 of the shell projects outward of or beyond the collar 10 and forms a support or mounting for the bearings B and in practice this element of the structure may handle lubricant for maintaining the bearings properly lubricated and a cooling medium for maintaining the bearings at proper working temperatures.

The chamber formed or defined by the body A may be considered as being divided into an inlet portion X, an impeller carrying portion Y and an outlet or delivery portion Z which extends to or terminates in an outlet duct 16. The main portion 20 of the shaft projecting from the supported end portion 21 thereof extends through the collar 10 and into the pump chamber where it has a reduced end portion 22 to carry the impeller D and threaded at 23 to carry a retainer 24 serving to retain the impeller on the shaft. A shoulder 25 occurs on the shaft between the portions 20 and 22 as clearly shown in Fig. 2 of the drawings.

The sleeve E is applied to the main portion 20 of the shaft to become, in effect, a part thereof, and is an elongate tubular member with a central opening or bore 30 snugly receiving the main portion 20 of the shaft. The inner end portion 31 of the sleeve is somewhat reduced and has a reduced portion or opening 32 receiving the reduced end portion 22 of the shaft. A shoulder 33 occurs between the bores 30 and 32 of the sleeve and when the sleeve is in place the shoulder 33 seats against the shoulder 25 of the shaft. The impeller D when in place bears against the inner end 34 of the sleeve holding the sleeve tight against the shoulder 25. The exterior 36 of the sleeve is a straight round highly finished portion of the sleeve concentric with the axis of the shaft and preferably extends completely through the collar 10 of the body to project beyond each end of the collar, as shown in the drawings. In the case illustrated the outer end of the sleeve has a threaded counterbore 37 carrying a gland 38 operable to set a packing 39 to seal between the shaft and the sleeve.

The packing means F may be of any suitable construction. In the drawings we have shown a packing construction of the type commonly found in structures of this general character. The packing means includes generally, a plurality of packing rings 40 in the counterbore 14 of the collar 10 divided into two groups which are separated by a lantern ring 41. The lantern ring as shown in the drawings has an outer peripheral channel 42 facing the wall of the counterbore and an inner peripheral channel 43 facing the exterior of the sleeve, the channels 42 and 43 being connected by a plurality of radial ports 44. The packing rings assembled with the lantern ring are held in the counterbore by a gland or follower 45 which may be operated by screw members 46, as clearly illustrated in the drawings. The member 45 enters the outer end of the counterbore and compresses the packing assembly in the counterbore to establish the desired pressure between the packing parts and the exterior of the sleeve. The thermal medium is supplied to the lantern ring 41 by a supply duct 49.

As illustrated in Fig. 1 of the drawings the thermal medium may be the same fluid as the material handled by the pump. In this form of our invention we have shown the supply duct 49 in communication with the high pressure portion Z of the pump through a suitable fluid connection 48 such as a tubing connection.

The scoop-shaped catchers 50 provided in the sleeve in register with the channel 43 of the lantern ring are provided to serve as catchers or scoops acting to receive fluid from the channel 43 of the lantern ring and deliver it to the chamber 51. In the form of the invention shown in Fig. 3 of the drawings there are two diametrically oppositely located buckets 50 and each bucket extends through the sleeve from its exterior or outer surface 36 to its interior where it discharges into the chamber 51. In practice the buckets may be variously formed or shaped to have the desired catching or scooping action. In the form shown in Fig. 3 the desired scooping action is gained by forming the back or trailing wall 53 of each bucket so that it is substantially radial while the forward or leading wall 54 extends from the point where the bucket communicates with the chamber 51 and extends substantially tangential therefrom, making the bucket substantially wider at the outer surface 36 of the sleeve than it is where the bucket opens into the chamber 51, the bucket being widened in the direction in which the shaft rotates.

The chamber 51 that we provide for handling the cooling fluid may be formed by counterboring the sleeve at 55 for a distance substantially coextensive with the body of packing that bears on the sleeve. In the case illustrated the counterbore 55 is shown of such depth as to provide a chamber of substantial capacity and the counterbore is shown as extending somewhat beyond the ends of the packing assembly that bears on the shaft. It will be apparent that a body of liquid circulating in the chamber 51 is in such close proximity to the portion of the sleeve on which the packing bears as to effectively pick up heat that may be generated by the engagement of the packing on the sleeve.

The outlet duct 52 that we provide may vary widely in form and character, as will appear from the various forms of the invention illustrated in the drawings. Generally speaking the outlet duct is arranged to connect with and receive fluid from the chamber 51 and it extends lengthwise of the shaft either within the sleeve or within the shaft or possibly both, and it may be extended to any desired point, either to a point outside of the pump chamber where the liquid can be handled in any suitable manner, or it can be extended into the pump chamber so that the liquid is delivered into the material being handled by the pump.

The particular outlet duct 52 shown in the form of the invention illustrated in Figs. 1 to 3 of the drawings is formed in the shaft C and it communicates with the chamber 51 at a plurality of points, preferably at each end thereof, so that no pockets are formed within the sleeve where gas may accumulate. Further, this particular outlet duct discharges into the inlet portion X of the pump chamber. The duct 52, as clearly shown in Figs. 1 and 2 of the drawings, includes a central longitudinal main portion 60 extending into the shaft from its inner end where it communicates with the chamber portion X to a point opposite the portion of the shaft sleeve surrounded by the packing actuator 45. A branch or lateral portion 61 of the duct 52 connects the end portion of the chamber 51 occurring within the member 45 with the main portion 60, while a similar branch 62 connects the other end of the chamber 51 with the main portion 60. With the construction just described the branch ducts 61 and 62, or other like or similar ducts, as circumstances may require, effectively receive the coolant after it has circulated through the chamber 51 and they deliver the coolant to the main duct 60 which conducts it to the inner end of the shaft where it discharges into the pump.

The form of the invention illustrated in Fig. 4 shows a construction designed to handle a coolant without discharging it into the pump and it shows a somewhat different outlet duct construction. In this form of the invention a longitudinal opening or channel 65 is provided in the exterior of the shaft portion 20ᵃ and the outlet duct 52ᵃ is a tubular member carried in the channel 65. The channel 65 is shown continuing substantially the entire length of the chamber 51 within the sleeve and outward from the sleeve to a point adjacent the point of connection between the portions 20ᵃ and 21ᵃ of the shaft. The inner end 66 of the duct terminates short of the innermost end of the channel 65 leaving the inner end of the duct open to receive fluid from the chamber 51. A lateral inlet opening 67 is provided in the side of the duct 52ᵃ at the other end of the chamber 51. The other or outer end 68 of the duct 52ᵃ terminates short of the outer or other end of the channel 65, at which point the shaft is surrounded by a collector ring 70 with an inner annular chamber 71 constantly in communication with the inner end of the duct to receive liquid therefrom. A discharge pipe 72 connects with the collector ring and may serve to conduct the fluid to any desired point.

In the form of the invention illustrated in Figs. 6 and 7 of the drawings the body A' has a shell portion 11' with ends 13' each of which carries a collar 10' through which the shaft C' extends. In this type of construction the base portion 80 of the body extends beyond the collar portions 10' to carry bearing supports 81 in which the outer end portions of the shaft operate. The shaft C' extends through the inlet portion X' of the pump chamber and supports the impeller D' between the ends 13' so that the impeller operates in the chamber Y'. Each of the collars 10' corresponds to the collar construction first described in that it has a counterbore 14' carrying the packing means F' which includes packing rings 40' in groups separated by a lantern ring 41', the packing assembly being clamped in the counterbore by a gland or actuating element 45' which enters the outer end of the counterbore 14'.

The shaft sleeves E', as shown in Figs. 6 and 7, are somewhat different than the shaft sleeve first described in that the two sleeves are oppositely disposed on the shaft with their inner ends threaded onto threaded portions 23' of the shafts so that the impeller is clamped between the inner ends 34' of the sleeves. Each sleeve has a central main bore 30' receiving a main portion 20' of the shaft and at its inner end portion each sleeve is counterbored at 32' to receive a somewhat enlarged central portion of the shaft. In this form of the invention supply ducts 49' are provided in the body construction communicating with the interior of each sleeve to supply a coolant thereto so that the coolant is delivered to the lantern rings within the collars.

In the form of the invention being described each shaft sleeve is provided with one or more buckets 50 and a chamber 51 is provided between each sleeve and the shaft and is preferably coextensive with the portion of the shaft engaged by the packing assembly.

The outlet duct 52ᵇ shown in Figs. 6 and 7 is of the same general type as that shown in Figs. 4 and 5 except that the tube which is carried in the shaft channel instead of extending to a collector ring is extended inward to discharge through a radially extending outlet port 85 in the inner end portion of the sleeve, which port is in communication with the inlet portion X' of the pump chamber.

In the form of the invention illustrated in Figs. 8 and 9 the discharge duct 52c is somewhat different in form from the ducts above described, in that it is confined to the sleeve and requires no special construction of the shaft which carries the sleeve. In this form of the invention the duct 52c is formed on the interior of the sleeve and extends inward beyond the chamber 51 to conduct fluid from the chamber 51 to the outlet port 85' which is formed in the sleeve and communicates with the inlet portion X' of the pump chamber.

From the foregoing description it will be apparent that we have provided various improvements in the structure by which a pump shaft is packed in a pump casing and through our invention we provide for not only delivering a coolant to a packing assembly but we provide for conducting the coolant delivered to the packing assembly in such manner that it circulates within the sleeve that is engaged by the packing to effectively pick up heat that may be generated by the engagement of the packing with the sleeve. By providing an effective and adequate outlet duct for the coolant advantageous circulation circulation may be established and maintained and by providing for the discharge of coolant from spaced parts of the chamber within the sleeve, as for instance from the end portions of the chamber, circulation is so maintained as to eliminate the danger of gas pockets which might create a serious hazard or impair effective operation of the structure.

From the foregoing description it will be apparent that we have provided a construction which may be advantageously incorporated in a pump shaft and a sleeve applied to such shaft or which may, if desired, be confined wholly to the pump shaft sleeve as shown in Fig. 8, in which case any ordinary or conventional pump shaft may be used and the entire construction that we provide may be confined to the sleeve which is applied to the shaft.

Having described only typical preferred forms and applications of our invention we do not wish to be limited or restricted to the specific details herein set forth but wish to reserve to ourselves any variations or modifications that may appear to those skilled in the art, and fall within the scope of the following claims.

Having described our invention, we claim:

1. A structure of the character described including, a case carrying a packing assembly, a shaft, a sleeve on the shaft engaged by packing of said assembly and having a portion spaced from the shaft forming a chamber and having a passage conducting fluid from the packing assembly to the chamber, and an outlet duct conducting fluid from the chamber including a conduit carried in a channel in the shaft.

2. A structure of the character described including, a case carrying a packing assembly, a shaft, a sleeve on the shaft engaged by packing of said assembly and having a portion spaced from the shaft forming a chamber and having a passage conducting fluid from the packing assembly to the chamber, and an outlet duct conducting fluid from the chamber including a conduit carried in a channel extending longitudinally in the exterior of the shaft.

3. A structure of the character described including, a case carrying a packing assembly, a shaft, a sleeve on the shaft engaged by packing of said assembly and having a portion spaced from the shaft forming a chamber and having a passage conducting fluid from the packing assembly to the chamber, and an outlet duct extending longitudinally of the shaft and open at the ends of the chamber where it communicates with the chamber and conducting fluid therefrom.

4. A shaft sleeve of the character described having a finished exterior to be engaged by a packing assembly and having a central opening to receive a shaft, there being a recess in the shaft opening to form a chamber around a shaft engaged in the sleeve and there being an inlet opening from the exterior of the sleeve to the said recess, the inlet opening being wider circumferentially at the exterior of the sleeve than at the interior thereof.

5. In combination, a shaft, and a sleeve on the shaft the exterior of which is finished to operate in a packing assembly, there being a space between the shaft and sleeve forming a liquid carrying chamber around the shaft and having an outlet opening, there being an opening through the sleeve from the exterior thereof to the said chamber to conduct fluid from a packing assembly engaging the sleeve to the chamber, the opening through the sleeve having a leading wall that is substantially tangential to the inner wall of the sleeve and a trailing wall that is substantially radial.

ALOIS B. PERRY.
LELAND S. HAMER.

REFERENCES CITED

The following references are of record in the file of this patent:

UNITED STATES PATENTS

| Number | Name | Date |
|---|---|---|
| 2,162,218 | Hill | June 13, 1939 |

FOREIGN PATENTS

| Number | Country | Date |
|---|---|---|
| 26,090 | Netherlands | 1932 |
| 129,969 | Switzerland | 1929 |
| 831,623 | France | 1938 |